US012424142B2

(12) United States Patent
Bae et al.

(10) Patent No.: US 12,424,142 B2
(45) Date of Patent: Sep. 23, 2025

(54) DRIVING CONTROLLER AND A DISPLAY DEVICE INCLUDING THE SAME

(71) Applicant: SAMSUNG DISPLAY CO., LTD., Yongin-si (KR)

(72) Inventors: Jaesung Bae, Suwon-si (KR); Junhan Ko, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/132,383

(22) Filed: Apr. 8, 2023

(65) Prior Publication Data

US 2024/0038134 A1 Feb. 1, 2024

(30) Foreign Application Priority Data

Jul. 26, 2022 (KR) ........................ 10-2022-0092249

(51) Int. Cl.
*G09G 3/20* (2006.01)

(52) U.S. Cl.
CPC ..... *G09G 3/2092* (2013.01); *G09G 2310/027* (2013.01); *G09G 2320/0626* (2013.01); *G09G 2360/12* (2013.01)

(58) Field of Classification Search
CPC ........... G09G 3/2092; G09G 2310/027; G09G 2320/0626; G09G 2360/12
See application file for complete search history.

(56) References Cited

U.S. PATENT DOCUMENTS

| | | | | |
|---|---|---|---|---|
| 11,605,332 B1 * | 3/2023 | Guo | G09G 3/3611 | |
| 2005/0001802 A1 * | 1/2005 | Lee | G09G 3/3648 | 345/89 |
| 2005/0140686 A1 * | 6/2005 | Kwon | G09G 5/397 | 345/98 |
| 2005/0264506 A1 * | 12/2005 | Kim | G09G 3/2092 | 345/87 |
| 2008/0174534 A1 * | 7/2008 | Park | G09G 3/3648 | 345/87 |
| 2010/0156949 A1 * | 6/2010 | Park | G09G 3/3607 | 345/99 |
| 2010/0238104 A1 * | 9/2010 | Liao | G09G 3/3648 | 345/99 |
| 2011/0279466 A1 * | 11/2011 | Park | G09G 3/3648 | 345/581 |

(Continued)

FOREIGN PATENT DOCUMENTS

| | | |
|---|---|---|
| KR | 10-0560780 | 3/2006 |
| KR | 10-0570995 | 4/2006 |

(Continued)

*Primary Examiner* — Md Saiful A Siddiqui
(74) *Attorney, Agent, or Firm* — F. CHAU & ASSOCIATES, LLC

(57) ABSTRACT

A driving controller including: a data converter configured to convert an X grayscale value of N-th frame data into a Y grayscale value of the N-th frame data; a frame memory configured to receive the Y grayscale value of the N-th frame data from the data convertor and output a Y grayscale value of N−1-th frame data to the data converter; and a data compensator configured to compensate the X grayscale value of the N-th frame data based on the X grayscale value of the N-th frame data and the Y grayscale value of the N−1-th frame data, wherein N is a natural number greater than or equal to 2.

15 Claims, 7 Drawing Sheets

(56) References Cited

U.S. PATENT DOCUMENTS

| | | | | |
|---|---|---|---|---|
| 2017/0213493 | A1* | 7/2017 | Han | G09G 3/3208 |
| 2020/0058251 | A1* | 2/2020 | Lee | G09G 3/3225 |
| 2020/0111405 | A1* | 4/2020 | Kim | G09G 3/2092 |
| 2021/0407443 | A1* | 12/2021 | Chang | G09G 3/3611 |
| 2022/0223116 | A1* | 7/2022 | Chen | G09G 3/3607 |
| 2022/0383805 | A1* | 12/2022 | Lee | G09G 3/3233 |

FOREIGN PATENT DOCUMENTS

| | | |
|---|---|---|
| KR | 10-2006-0120899 | 11/2006 |
| KR | 10-0768047 | 10/2007 |
| KR | 10-2017-0001788 | 1/2017 |

* cited by examiner

DRIVING CONTROLLER AND A DISPLAY DEVICE INCLUDING THE SAME

CROSS-REFERENCE TO RELATED APPLICATION

This application claims priority under 35 U.S.C. § 119 to Korean Patent Application No. 10-2022-0092249, filed on Jul. 26, 2022 in the Korean Intellectual Property Office KIPO, the disclosure of which is incorporated by reference herein in its entirety.

1. TECHNICAL FIELD

The present inventive concept relates to a driving controller and a display device including the same. More particularly, the present inventive concept relates to a driving controller for enhancing display quality and a display device including the same.

2. DESCRIPTION OF THE RELATED ART

A display device is an output device for presentation of information in visual form. In general, the display device includes a display panel and a display panel driver. The display panel displays an image based on input image data, and includes gate lines, data lines, and pixels arranged at intersections of the gate lines and the data lines. The display panel driver includes a gate driver for providing a gate signal to the gate lines, a data driver for providing a data voltage to the data lines, and a driving controller for controlling the gate driver and the data driver.

An actual luminance of the display panel may be gradually changed when a grayscale value of frame data of input image data provided to the driving controller is changed. Accordingly, a step efficiency, in which the display panel emits light at a target luminance after a certain time period has passed from a time point when the grayscale value of the frame data is changed, may be generated. Thus, when it takes a long time for the actual luminance of the display panel to reach the target luminance, a blur and a color drag may occur in the display panel. In a conventional method to prevent the blue and the color drag, when the grayscale value of the frame data is changed it is overdriven compared to the grayscale value of the frame data before the change. However, in the conventional method, the grayscale value of the frame data is only overdriven in a first frame after the change. As a consequence, the blur and the color drag may still occur when it takes a long time for the actual luminance of the display panel to reach the target luminance.

SUMMARY

Embodiments of the present inventive concept provide a driving controller for enhancing display quality by overdriving a grayscale value of frame data during a plurality of frames.

Embodiments of the present inventive concept provide a display device including the driving controller.

An embodiment of the present inventive concept provides a driving controller including: a data converter configured to convert an X grayscale value of N-th frame data into a Y grayscale value of the N-th frame data; a frame memory configured to receive the Y grayscale value of the N-th frame data from the data convertor and output a Y grayscale value of N−1-th frame data to the data converter; and a data compensator configured to compensate the X grayscale value of the N-th frame data based on the X grayscale value of the N-th frame data and the Y grayscale value of the N−1-th frame data, wherein N is a natural number greater than or equal to 2.

The data converter is configured to convert the X grayscale value of the N-th frame data into the Y grayscale value of the N-th frame data based on the X grayscale value of the N-th frame data and the Y grayscale value of the N−1-th frame data.

When the X grayscale value of the N-th frame data and the Y grayscale value of the N−1-th frame data are same, the data converter is configured to provide the Y grayscale value of the N-th frame data, which is the same as the X grayscale value of the N-th frame data, to the frame memory, and when the X grayscale value of the N-th frame data and the Y grayscale value of the N−1-th frame data are different, the data converter is configured to provide the Y grayscale value of the N-th frame data, which is different from the X grayscale value of the N-th frame data, to the frame memory.

When the X grayscale value of the N-th frame data and the Y grayscale value of the N−1-th frame data are different, the Y grayscale value of the N-th frame data is a value between the X grayscale value of the N-th frame data and the Y grayscale value of the N−1-th frame data.

The data converter is configured to convert the X grayscale value of the N-th frame data into the Y grayscale value of the N-th frame data based on the X grayscale value of the N-th frame data, the Y grayscale value of the N−1-th frame data, and a temperature of a display panel.

The driving controller may further include a first lookup table generator, wherein the first lookup table generator is configured to generate a first lookup table based on the temperature of the display panel, and wherein the driving controller is configured to convert the X grayscale value of the N-th frame data into the Y grayscale value of the N-th frame data using the first lookup table.

The first lookup table generator is configured to interpolate a first temperature lookup table corresponding to a first temperature and a second temperature lookup table corresponding to a second temperature to generate a third temperature lookup table corresponding to a third temperature between the first temperature and the second temperature.

The data converter is configured to convert the X grayscale value of the N-th frame data into the Y grayscale value of the N-th frame data based on the X grayscale value of the N-th frame data, the Y grayscale value of the N−1-th frame data, and a luminance condition of a display panel.

The driving controller may further include a first lookup table generator, wherein the first lookup table generator is configured to generate a first lookup table based on the luminance condition of the display panel, and wherein the driving controller is configured to convert the X grayscale value of the N-th frame data into the Y grayscale value of the N-th frame data using the first lookup table.

The data compensator is configured to generate an overdriving compensation value to compensate the X grayscale value of the N-th frame data based on the X grayscale value of the N-th frame data and the Y grayscale value of the N−1-th frame data.

When the X grayscale value of the N-th frame data and the Y grayscale value of the N−1-th frame data are same, the overdriving compensation value is 0.

When the X grayscale value of the N-th frame data and the Y grayscale value of the N−1-th frame data are different, the overdriving compensation value is not 0.

The data compensator is configured to compensate the X grayscale value of the N-th frame data by adding the overdriving compensation value to the X grayscale value of the N-th frame data.

An embodiment of the present inventive concept provides a display device including: a display panel configured to display an image based on a plurality of frame data of input image data; a driving controller including a data converter configured to convert an X grayscale value of N-th frame data into a Y grayscale value of the N-th frame data, and to provide the Y grayscale value of the N-th frame data to a frame memory, the frame memory configured to provide a Y grayscale value of N−1-th frame data to the data converter and a data compensator, and to store the Y grayscale value of the N-th frame data, and the data compensator configured to compensate the X grayscale value of the N-th frame data based on the X grayscale value of the N-th frame data and the Y grayscale value of the N−1-th frame data, and to generate a X' grayscale value of the N-th frame data; and a data driver configured to convert the X' grayscale value of the N-th frame data into a data voltage, and to output the data voltage to the display panel, wherein N is a natural number greater than or equal to 2.

The data converter is configured to convert the X grayscale value of the N-th frame data into the Y grayscale value of the N-th frame data based on the X grayscale value of the N-th frame data and the Y grayscale value of the N−1-th frame data.

When the X grayscale value of the N-th frame data and the Y grayscale value of the N−1-th frame data are same, the data converter is configured to provide the Y grayscale value of the N-th frame data, which is to the same as the X grayscale value of the N-th frame data, to the frame memory and when the X grayscale value of the N-th frame data and the Y grayscale value of the N−1-th frame data are different, the data converter is configured to provide the Y grayscale value of the N-th frame data, which is different from the X grayscale value of the N-th frame data, to the frame memory.

When the X grayscale value of the N-th frame data and the Y grayscale value of the N−1-th frame data are different, the Y grayscale value of the N-th frame data is a value between the X grayscale value of the N-th frame data and the Y grayscale value of the N−1-th frame data.

The data converter is configured to convert the X grayscale value of the N-th frame data into the Y grayscale value of the N-th frame data based on the X grayscale value of the N-th frame data, the Y grayscale value of the N−1-th frame data, and a temperature of the display panel.

The data converter is configured to convert the X grayscale value of the N-th frame data to the Y grayscale value of the N-th frame data based on the X grayscale value of the N-th frame data, the Y grayscale value of the N−1-th frame data, and a luminance condition of the display panel.

The data compensator is configured to generate an overdriving compensation value to compensate the X grayscale value of the N-th frame data based on the X grayscale value of the N-th frame data and the Y grayscale value of the N−1-th frame data.

An embodiment of the present inventive concept provides a driving controller including: a data converter configured to receive an X grayscale value of N-th frame data and a Y grayscale value of N−1-th frame data and convert the X grayscale value of the N-th frame data into a Y grayscale value of the N-th frame data using at least one of temperature and luminance information of a display panel; a frame memory configured to receive the Y grayscale value of the N-th frame data from the data convertor and output the Y grayscale value of the N−1-th frame data; and a data compensator configured to receive the Y grayscale value of the N−1-th frame data from the frame memory and receive the X grayscale value of the N-th frame data and compensate the X grayscale value of the N-th frame data based on the X grayscale value of the N-th frame data and the Y grayscale value of the N−1-th frame data, wherein N is a natural number greater than or equal to 2.

According to the drive controller and the display device including the same, the driving controller may include the data converter for converting the X grayscale value of the N-th frame data into the Y grayscale value of the N-th frame data based on the X grayscale value of the N-th frame data and the Y grayscale value of the N−1-th frame data, and for providing the Y grayscale value of the N-th frame data to the frame memory. Since the frame memory does not store an input grayscale value of the input image data as it is, but stores a grayscale value converted by the data converter, the data compensator may perform overdriving during a plurality of frames using the converted grayscale value without increasing the number of the frame memory. Accordingly, even when it takes a long time for an actual luminance of the display panel to reach the target luminance, the blur and the color drag in the display panel may be prevented.

BRIEF DESCRIPTION OF THE DRAWINGS

The above and other features of the present inventive concept will become more apparent by describing in detail embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
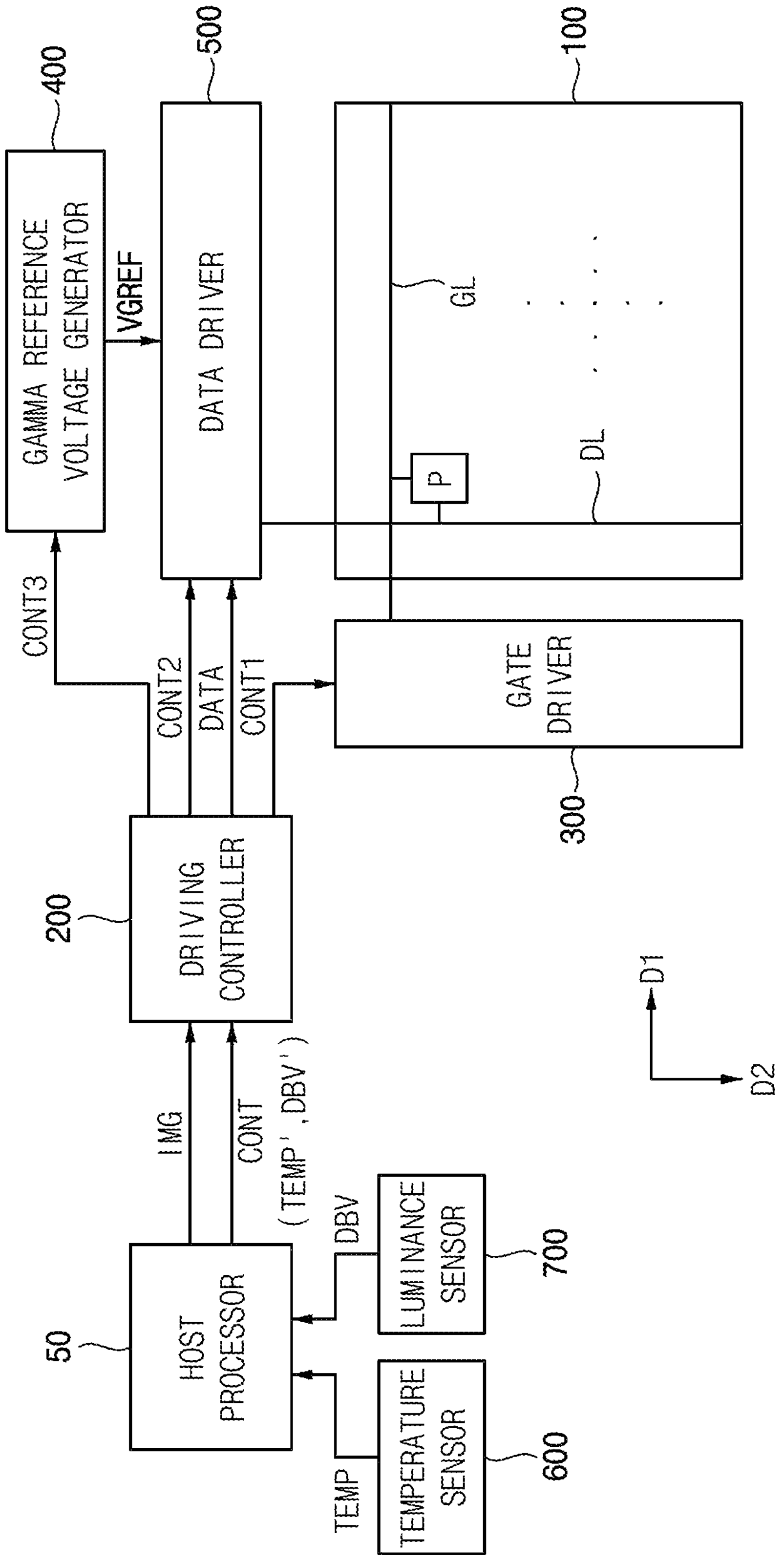
FIG. 1 is a block diagram illustrating a display device according to an embodiment of the present inventive concept.

FIG. 1 is a block diagram illustrating a display device according to an embodiment of the present inventive concept Referring to FIG. 1, the display device includes a host processor 50, a display panel 100, and a display panel driver.

The host processor 50 may receive a temperature TEMP of the display panel 100 from a temperature sensor 600, and receive a luminance condition DBV of the display panel 100 from a luminance sensor 700. The host processor 50 may output input image data IMG and an input control signal CONT to a driving controller 200. The input control signal CONT may include a temperature signal TEMP' and a luminance signal DBV'. The display panel driver includes the driving controller 200, a gate driver 300, a gamma reference voltage generator 400 and a data driver 500. For example, the driving controller 200 and the data driver 500 may be integrally formed. For example, the driving controller 200, the gamma reference voltage generator 400, and the data driver 500 may be integrally formed. A driving module including at least the driving controller 200 and the data driver 500 which are integrally formed may be called to a timing controller embedded data driver (TED).

The display panel 100 includes a display region for displaying an image and a peripheral region disposed adjacent to the display region.

The display panel 100 includes a plurality of gate lines GL, a plurality of data lines DL, and a plurality of pixels P electrically connected to the gate lines GL and the data lines DL. The gate lines GL extend in a first direction D1, and the data lines DL extend in a second direction D2 crossing the first direction D1.

The driving controller 200 may receive the input image data IMG and the input control signal CONT from the host processor 50, and the input image data IMG may include frame data. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500. Here, the input image data IMG may include a grayscale value of the frame data, and the data signal DATA may include an overdriven grayscale value of the frame data.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 will be explained in detail later referring to FIGS. 2 to 7.

The gate driver 300 generates gate signals for driving the gate lines GL in response to the first control signal CONT1 received from the driving controller 200. The gate driver 300 outputs gate signals to the gate lines GL. For example, the gate driver 300 may sequentially output the gate signals to the gate lines GL. For example, the gate driver 300 may be mounted on the peripheral region of the display panel 100. For example, the gate driver 300 may be integrated on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to the data signal DATA.

In an embodiment of the present inventive concept, the gamma reference voltage generator 400 may be disposed in the driving controller 200 or in the data driver 500.

The data driver 500 receives the second control signal CONT2 and the data signal DATA from the driving controller 200, and receives the gamma reference voltage VGREF from the gamma reference voltage generator 400. The data driver 500 converts the data signal DATA into an analog data voltage using the gamma reference voltage VGREF. The data driver 500 outputs the data voltage to the data lines DL. For example, the data driver 500 may convert the overdriven grayscale value into the data voltage.

An actual luminance of the display panel 100 may be gradually changed when the grayscale value of the frame data provided to the driving controller 200 is changed. Accordingly, a step efficiency, in which the display panel 100 emits light at a target luminance after a certain time period has passed from a time point when the grayscale value of the frame data is changed, may be generated. Thus, when it takes a long time for the actual luminance of the display panel 100 to reach the target luminance, a blur and a color drag may occur in the display panel 100. Herein, the ratio of the actual luminance to the target luminance may be referred to as a target luminance reaching rate.

The driving controller 200 may receive the grayscale value of the frame data, and the grayscale value of the frame data may be changed from a grayscale value of N−1-th frame data IMG[N−1] to a grayscale value of N-th frame data IMG[N]. In this case, the actual luminance of the display panel 100 may be changed gradually rather than immediately from a luminance that corresponds to the grayscale value of the N−1-th frame data IMG[N−1] to the grayscale value of the N-th frame data IMG[N]. Accordingly, the actual luminance of the display panel 100 may reach the target luminance of the display panel 100 after a certain time period has passed from a time point when the grayscale value of the frame data is changed. When the actual luminance of the display panel 100 is a luminance corresponding to the grayscale value of the N−1-th frame data IMG[N−1], the target luminance reaching rate may be 0%. When the actual luminance of the display panel 100 is an average value of the luminance corresponding to the grayscale value of the N−1-th frame data IMG[N−1] and a luminance corresponding to the grayscale value of the N-th frame data IMG[N], the target luminance reaching rate may be 50%. When the actual luminance of the display panel 100 is the luminance corresponding to the grayscale value of the N-th frame data IMG[N], the target luminance reaching rate may be 100%. The target luminance reaching rate may be a value between 0% and 100%, and when the target luminance reaching rate is 100%, the actual luminance of the display panel 100 may reach the target luminance.

Figure 2:
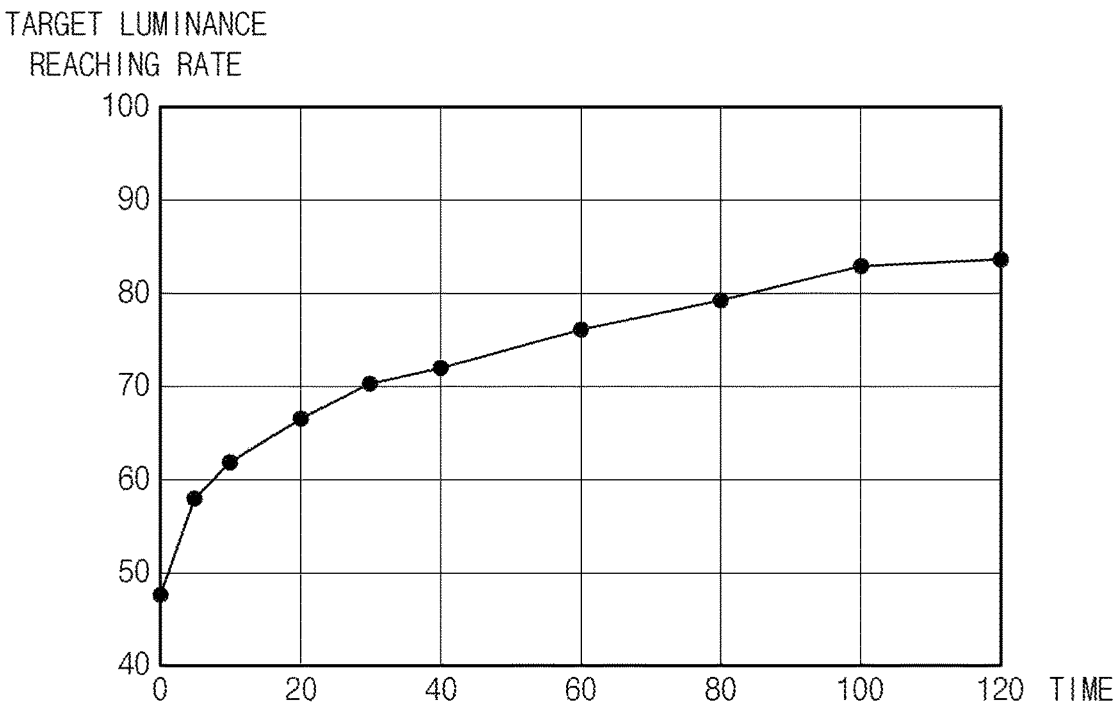
FIG. 2 is a graph illustrating an example of an actual luminance of a display panel of FIG. 1 when a grayscale value of input image data is changed from a low grayscale value to a high grayscale value.
Figure 3:
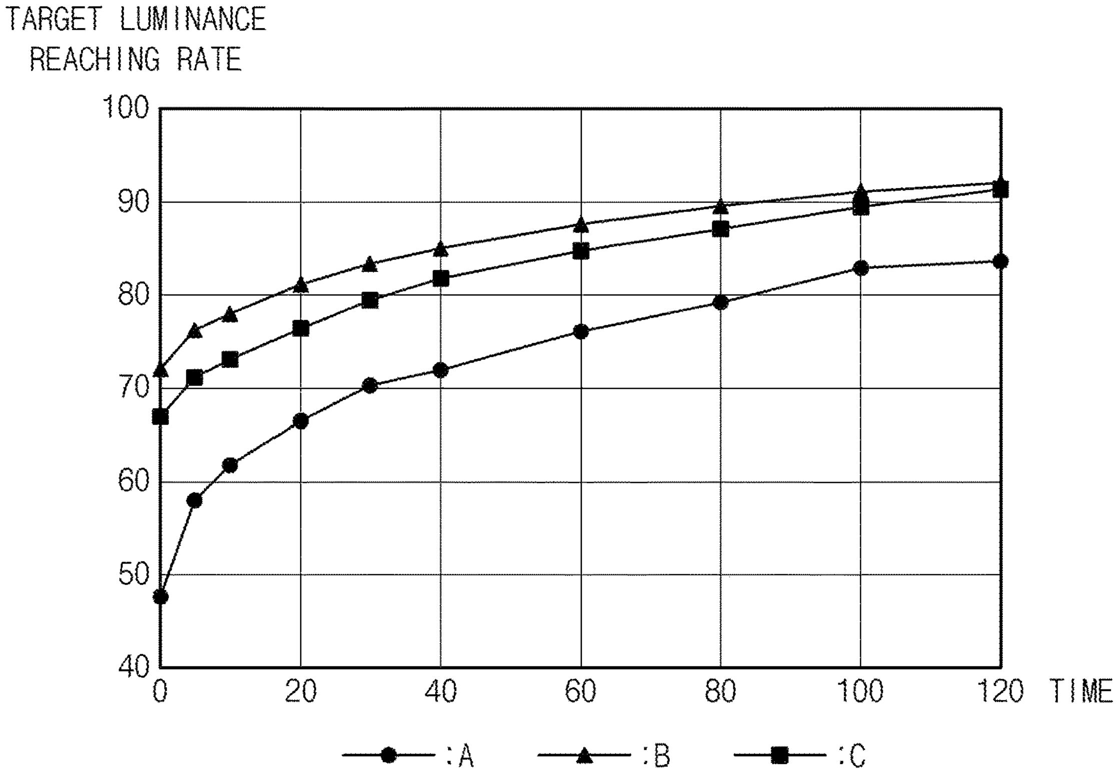
FIG. 3 is a graph illustrating an example of the actual luminance of the display panel of FIG. 1 when the grayscale value of the input image data is changed from the low grayscale value to the high grayscale value.

FIG. 2 and FIG. 3 are graphs illustrating examples of the actual luminances of the display panel 100 of FIG. 1 when the grayscale value of the input image data IMG is changed from a low grayscale value to a high grayscale value.

Referring to FIGS. 1 to 3, a display panel A, a display panel B, and a display panel C refer to display panels 100 having different panel characteristics.

When the grayscale value of the frame data is changed from the grayscale value of the N−1-th frame data IMG[N−1] to the grayscale value of the N-th frame data IMG[N], the actual luminance of the display panel 100 may gradually increase, and the target luminance reaching rate may gradually increase as time passes in the display panel A, the display panel B, and the display panel C.

Since panel characteristics of the display panel A, the display panel B, and the display panel C are different from each other, speeds of the display panel A, the display panel B, and the display panel C at which the actual luminance of the display panel 100 increases may be different from one another and speeds of the display panel A, the display panel B, and the display panel C at which the target luminance reaching rate increases may be different from one another. Thus, a time at which the target luminance reaching rate is 100% may also be different depending on the display panel A, the display panel B, and the display panel C.

The actual luminance of the display panel 100 is gradually changed when the grayscale value of the frame data provided to the driving controller 200 is changed. Accordingly, the step efficiency, in which the display panel 100 emits light at the target luminance after the certain time period has passed from the time point when the grayscale value of the frame data is changed, may be generated. Thus, when it takes a long time for the actual luminance of the display panel 100 to reach the target luminance, a blur and a color drag may occur in the display panel 100.

Accordingly, in order to enhance the display quality of the display panel 100, the driving controller 200 may shorten a time for the target luminance reaching rate to reach 100%.

When the grayscale value of the frame data is changed from the grayscale value of the N−1-th frame data IMG[N−1] to the grayscale value of the N-th frame data IMG[N], the grayscale value of the N−1-th frame data IMG[N−1] and the grayscale value of the N-th frame data IMG[N] may be compared and the grayscale value of the N-th frame data IMG[N] may be overdriven. When the grayscale value of the frame data is changed from the grayscale value of the N−1-th frame data IMG[N−1] to the grayscale value of the N-th frame data IMG[N], in order to shorten the time for the target luminance reaching rate to reach 100%, the driving controller 200 may apply overdriving in which the grayscale value of the N-th frame data IMG[N] is increased to be greater than an input grayscale value.

For example, when the grayscale value of the frame data is changed from the grayscale value of the N−1-th frame data IMG[N−1] which is 0 Gray to the grayscale value of the N-th frame data IMG[N] which is 100 Gray and the grayscale value of the frame data is not overdriven, in N-th frame, the actual luminance of the display panel 100 may increase to a luminance corresponding to 50 Gray instead of a luminance corresponding to 100 Gray which is the target luminance. In this case, in order to shorten the time for the target luminance reaching rate to reach 100%, the driving controller 200 may overdrive the grayscale value of the N-th frame data IMG[N] by 50 Gray to convert the grayscale value of the N-th frame data IMG[N] into 150 Gray. In this case, in the N-th frame, the actual luminance of the display panel 100 may increase to a luminance corresponding to 70 Gray, which is higher than the luminance corresponding to 50 Gray. Accordingly, the time for the target luminance reaching rate to reach 100% may be shortened.

Conventionally, when the grayscale value of the frame data is changed from the grayscale value of the N−1-th frame data IMG[N−1] to the grayscale value of the N-th frame data IMG[N], the driving controller 200 applies overdriving using only the grayscale values of the previous frame and the current frame, so that the driving controller 200 applies overdriving for the grayscale values of the N-th frame data IMG[N] only in the N-th frame.

For example, the grayscale value of the frame data may be a first grayscale value in an N−1-th frame, and may maintain a constant second grayscale value in an N-th frame, N+1-th frame, and N+2-th frame. Conventionally, since overdriving is applied using only a grayscale value of a previous frame data and a grayscale value of a current frame data, the driving controller 200 may overdrive the grayscale values of the N-th frame data IMG[N] in the N-th frame. However, since the grayscale value of the previous frame data and the grayscale value of the current frame data are the same in the N+1-th frame and the N+2-th frame, the driving controller 200 may not overdrive the grayscale value of an N+1-th frame data IMG[N+1] from the N+1-th frame. Therefore, even if the driving controller 200 overdrives in the N-th frame, it may still take a long time for the actual luminance of the display panel 100 to reach the target luminance. Therefore, the blur and the color drag may occur in the display panel 100.

In order to shorten the time for the target luminance reaching rate to reach 100%, the driving controller 200, according to an embodiment of the present inventive concept, may overdrive the grayscale values of a plurality of frame data for a plurality of frames, rather than overdrive the grayscale value of the frame data only for one frame.

Figure 4:
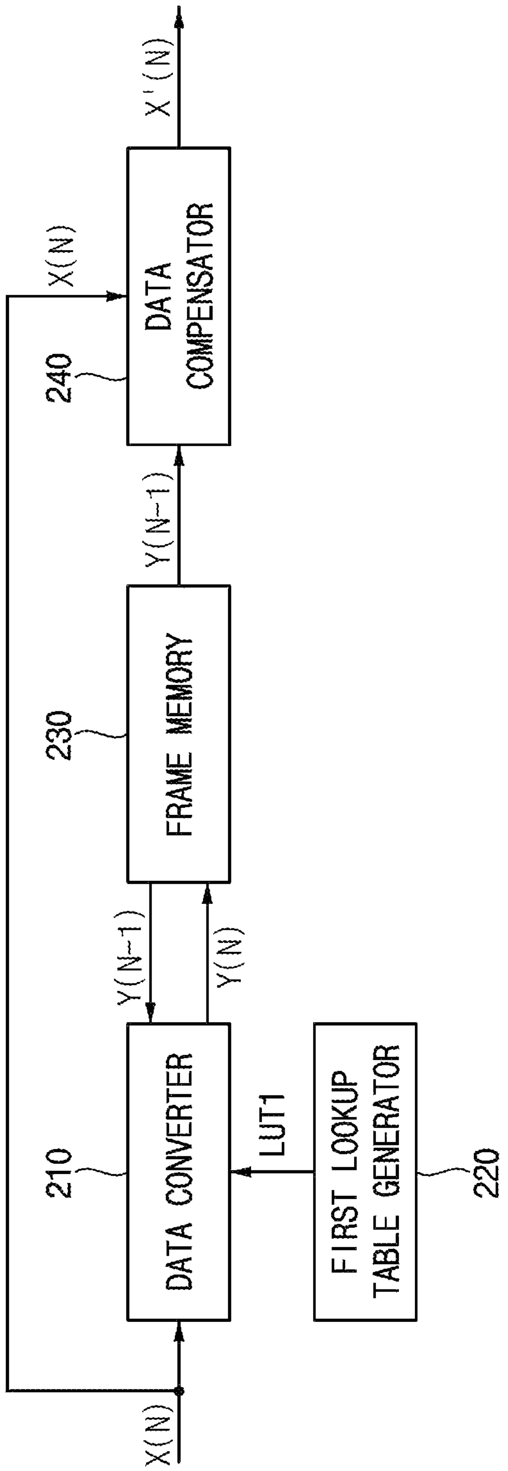
FIG. 4 is a block diagram of a driving controller of FIG. 1 performing an overdriving operation during a plurality of frames.

FIG. 4 is a block diagram of the driving controller 200 of FIG. 1 performing an overdriving operation during a plurality of frames.

Referring to FIGS. 1 to 4, the driving controller 200 may include a data converter 210, a frame memory 230, and a data compensator 240. Each of the data converter 210, the frame memory 230, and the data compensator 240 may be implemented in hardware as a circuit. X(N) may be a X grayscale value of the N-th frame data IMG[N], Y(N−1) may be a Y grayscale value of the N−1-th frame data IMG[N−1], and Y(N) is a Y grayscale value of the N-th frame data IMG[N], X'(N) may be a overdriven grayscale value of the N-th frame data IMG[N].

The data converter 210 may receive the X grayscale value X(N−1) of the N−1-th frame data IMG[N−1] in the N−1-th frame and convert the X grayscale value X(N−1) of the N−1-th frame data IMG[N−1] into the Y grayscale value Y(N−1) of the N−1-th frame data IMG[N−1], and provide the Y grayscale value Y(N−1) of the N−1-th frame data IMG[N−1] to the frame memory 230. The data converter 210 may receive the X grayscale value X(N) of the N-th frame data IMG[N] in the N-th frame, convert the X grayscale value X(N) of the N-th frame data IMG[N] into the Y grayscale value Y(N) of the N-th frame data IMG[N], and provide the Y grayscale value Y(N) of the N-th frame data IMG[N] to the frame memory 230.

When the data converter 210 receives the X grayscale value X(N) of the N-th frame data IMG[N] to overdrive the grayscale values of frame data during a plurality of frames, in the N-th frame the data converter 210 may convert the X grayscale value X(N) of the N-th frame data IMG[N] into the Y grayscale value Y(N) of the N-th frame data IMG[N] based on the X grayscale value X(N) of the N-th frame data IMG[N] and the Y grayscale value Y(N−1) of the N−1-th frame data IMG[N−1]. In other words, the Y grayscale value Y(N) of the N-th frame data IMG[N], which is provided to the frame memory 230, is based on the X grayscale value X(N) of the N-th frame data IMG[N] and the Y grayscale value Y(N−1) of the N−1-th frame data IMG[N−1].

For example, the grayscale value of the frame data may be 0 Gray in N−1-th frames, and may maintain constant 255 Gray in N-th frames, N+1-th frames, and N+2-th frames. In the N-th frame, the actual luminance of the display panel 100 may not increase to a luminance corresponding to 255 Gray, but may increase to a luminance corresponding to 150 Gray. Conventionally, although the actual luminance of the display panel 100 does not increase to a luminance corresponding to 255 Gray in the N+1-th frame and the N+2-th frame, since the grayscale value of the previous frame data and the grayscale value of the current frame data are the same in the N+1-th frame and the N+2-th frame, the driving controller 200 may not apply overdriving. In this embodiment, in order for the driving controller 200 to recognize the X grayscale value X(N) of the N-th frame data IMG[N], which is 255 Gray in the N+1-th frame, as 150 Gray corresponding to the actual luminance, the data converter 210 converts the X grayscale value X(N) of the N-th frame data IMG[N] which is 255 Gray into the Y grayscale value Y(N) of the N-th frame data IMG[N] which is 150 Gray (N)) and provides the Y grayscale value Y(N) of the N-th frame data IMG[N] which is 150 Gray (N)) to the frame memory 230. In this case, the driving controller 200 may recognize that the grayscale value of the frame data is changed from 150 Gray to 255 Gray in the N+1-th frame. Accordingly, in the N+1-th frame, the driving controller 200 may overdrive the X grayscale value X(N+1) of the N+1-th frame data IMG[N+1]. In other words, the driving controller 200 may apply an overdriving in a frame other than the N-th frame.

The data converter 210 may convert the X grayscale value X(N) of the N-th frame data IMG[N] into the Y grayscale value Y(N) of the N-th frame data IMG[N] based on the X grayscale value X(N) of the N-th frame data IMG[N] and the Y grayscale value Y(N−1) of the N−1-th frame data IMG [N−1]. When the X grayscale value X(N) of the N-th frame data IMG[N] and the Y grayscale value Y(N−1) of the N−1-th frame data IMG[N−1] are the same, the data converter 210 may provide the Y grayscale value Y(N) of the N-th frame data IMG[N] which is equal to the X grayscale value X(N) of the N-th frame data IMG[N] to the frame memory 230. When the X grayscale value X(N) of the N-th frame data IMG[N] and the Y grayscale value Y(N−1) of the N−1-th frame data IMG[N−1] are different, the data converter 210 may provide the Y grayscale value Y(N) of the N-th frame data IMG[N] which is different from the X grayscale value X(N) of the N-th frame data IMG[N] to the frame memory 230.

When the X grayscale value X(N) of the N-th frame data IMG[N] is different from the Y grayscale value Y(N−1) of the N−1-th frame data IMG[N−1], the Y grayscale value Y(N) of the N-th frame data IMG[N] may be a value between the X grayscale value X(N) of the N-th frame data IMG[N] and the Y grayscale value Y(N−1) of the N−1-th frame data IMG[N−1].

For example, when the Y grayscale value Y(N−1) of the N−1-th frame data IMG[N−1] and the X grayscale value X(N) of the N-th frame data IMG[N]) are equal to 255 Gray, the data converter 210 provide the Y grayscale value (Y(N), for example, 255 Gray) of the N-th frame data IMG[N] which is equal to the X grayscale value (X(N), for example, 255 Gray) of the N-th frame data IMG[N] to the frame memory 230. When the Y grayscale value Y(N−1) of the N−1-th frame data IMG[N−1] is 0 Gray and the X grayscale value X(N) of the N-th frame data IMG[N]) is 255 Gray, since the Y grayscale value Y(N−1) of the N−1-th frame data IMG[N−1] and the X grayscale value X(N) of the N-th frame data IMG[N] is different, the data converter 210 may provide the Y grayscale value Y(N) of the N-th frame data IMG[N] which is different from the X grayscale value (X(N), for example, 255 Gray) of the N-th frame data IMG[N] to the frame memory 230. In this case, the actual luminance of the display panel 100 may not increase to the luminance corresponding to 255 Gray, but may increase to the luminance corresponding to 150 Gray. In other words, the Y grayscale value Y(N) of the N-th frame data IMG[N] may be 150 Gray between the X grayscale value (X(N), for example, 255 Gray) of the N-th frame data IMG[N] and the Y grayscale value (Y(N−1), for example, 0 Gray) of the N−1-th frame data IMG[N−1].

In this embodiment, the data converter 210 may also convert the X grayscale value X(N) of the N-th frame data IMG[N] into the Y grayscale value Y(N) of the N-th frame data IMG[N] based on the X grayscale value X(N) of the N-th frame data IMG[N], the Y grayscale value Y(N−1) of the N−1-th frame data IMG[N−1], and a temperature TEMP of the display panel 100. The temperature TEMP of the display panel 100 may be measured by the temperature sensor 600. The temperature sensor 600 may output the temperature TEMP of the display panel 100 to the host processor 50. The host processor 50 may output the input image data IMG and the input control signal CONT to the data converter 210. The input control signal CONT may include the temperature signal TEMP'. The data converter 210 may convert the X grayscale value X(N) of the N-th frame data IMG[N] into the Y grayscale value Y(N) of the N-th frame data IMG[N] based on a predicted value rather than a measured value of the temperature TEMP of the display panel 100.

For example, the driving controller 200 may further include a first lookup table generator 220. The first lookup table generator 220 may generate a first lookup table LUT1 which varies according to the temperature TEMP of the display panel 100. The first lookup table generator 220 may be implemented in hardware as a circuit.

The driving controller 200 may convert the X grayscale value X(N) of the N-th frame data IMG[N] into the Y grayscale value Y(N) of the N-th frame data IMG[N] using the first lookup table LUT1 which varies according to the temperature TEMP of the display panel 100.

The first lookup table LUT1 may store the Y grayscale value Y(N) of the N-th frame data IMG[N] based on the X grayscale value X(N) of the N-th frame data IMG[N] and the Y grayscale value Y(N−1) of the N−1-th frame data IMG [N−1].

When the driving controller 200 converts the X grayscale value X(N) of the N-th frame data IMG[N] into the Y grayscale value Y(N) of the N-th frame data IMG[N], the Y grayscale value Y(N) may be different when the temperature TEMP of the display panel 100 is taken into consideration and when the temperature TEMP of the display panel 100 is not taken into consideration. In addition, when the temperature TEMP of the display panel 100 is different, the Y grayscale value Y(N) may be different.

For example, when the temperature TEMP of the display panel 100 is not considered and when the temperature TEMP of the display panel 100 is 10 degrees Celsius, the Y grayscale value Y(N) may be different. In addition, the Y grayscale value Y(N) may be different when the temperature TEMP of the display panel 100 is 10 degrees Celsius and when the temperature TEMP of the display panel 100 is 20 degrees Celsius.

The first lookup table generator 220 may interpolate a first temperature lookup table corresponding to a first temperature and a second temperature lookup table corresponding to a second temperature to generate a third temperature lookup table corresponding to a third temperature between the first temperature and the second temperature. For example, the first lookup table generator 220 may generate the first temperature lookup table corresponding to 10 degrees Celsius and the second temperature lookup table corresponding to 20 degrees Celsius, and the temperature TEMP of the display panel 100 measured by the temperature sensor 600 may be 15 degrees Celsius. In this case, the first lookup table generator 220 may interpolate the first temperature lookup table corresponding to 10 degrees Celsius and the second temperature lookup table corresponding to 20 degrees Celsius to generate the third temperature lookup table corresponding to 15 degrees Celsius between 10 degrees Celsius and 20 degrees Celsius.

In this embodiment, the data converter 210 may convert the X grayscale value X(N) of the N-th frame data IMG[N] into the Y grayscale value Y(N) of the N-th frame data IMG[N] based on the X grayscale value X(N) of the N-th frame data IMG[N], the Y grayscale value Y(N−1) of the N−1-th frame data IMG[N−1], and the luminance condition DBV of a display panel 100. The luminance condition DBV of the display panel 100 may be automatically determined by an ambient luminance measured by the luminance sensor 700. The luminance condition DBV of the display panel 100 may be manually set by a user. The luminance condition DBV of the display panel 100 may be a maximum luminance of the display panel 100 corresponding to the maximum grayscale value of input image data IMG. The host processor 50 may output the input image data IMG and the input control signal CONT to the data converter 210. The input control signal CONT may include a luminance signal DBV'.

In this case, for example, the first lookup table generator 220 may generate a first lookup table LUT1 which varies according to the luminance condition DBV of the display panel 100.

The driving controller 200 may convert the X grayscale value X(N) of the N-th frame data IMG[N] into the Y grayscale value Y(N) of the N-th frame data IMG[N] using the first lookup table LUT1 which varies according to the luminance condition DBV When the driving controller 200 converts the X grayscale value X(N) of the N-th frame data IMG[N] into the Y grayscale value Y(N) of the N-th frame data IMG[N], the Y grayscale value Y(N) may be different when the luminance condition DBV of the display panel 100 is taken into consideration and when the luminance condition DBV of the display panel 100 is not taken into consideration. In addition, when the luminance condition DBV of the display panel 100 is different, the Y grayscale value Y(N) may be different.

For example, when the luminance condition DBV of the display panel 100 is not considered and when the luminance condition DBV of the display panel 100 is 100 nit, the Y grayscale value Y(N) may be different. In addition, the Y grayscale value Y(N) may be different when the luminance condition DBV of the display panel 100 is 100 nit and when the luminance condition DBV of the display panel 100 is 200 nit.

The first lookup table generator 220 may interpolate a first luminance lookup table corresponding to a first luminance condition and a second luminance lookup table corresponding to a second luminance condition to generate a third luminance lookup table corresponding to a third luminance condition between the first luminance condition and the second luminance condition. For example, the first lookup table generator 220 may generate the first luminance lookup table corresponding to 100 nit and the second luminance lookup table corresponding to 200 nit, and the luminance condition DBV of the display panel 100 measured by the luminance sensor 700 may be 150 nit. In this case, the first lookup table generator 220 may interpolate the first luminance lookup table corresponding to 100 nit and the second luminance lookup table corresponding to 200 nit to generate the third luminance lookup table corresponding to 150 nit between 100 nit and 200 nit.

In this embodiment, the data converter 210 may convert the X grayscale value X(N) of the N-th frame data IMG[N] into the Y grayscale value Y(N) of the N-th frame data IMG[N] based on the X grayscale value X(N) of the N-th frame data IMG[N], the Y grayscale value Y(N−1) of the N−1-th frame data IMG[N−1], the temperature TEMP of the display panel 100, and the luminance condition DBV of the display panel 100.

In this case, for example, the first lookup table generator 220 may generate a first lookup table LUT1 which varies according to the temperature TEMP of the display panel 100 and the luminance condition DBV of the display panel 100.

The driving controller 200 may convert the X grayscale value X(N) of the N-th frame data IMG[N] into the Y grayscale value Y(N) of the N-th frame data IMG[N] using the first lookup table LUT1 which varies according to the temperature TEMP and the luminance condition DBV.

The first lookup table LUT1 may store the Y grayscale value Y(N) of the N-th frame data IMG[N] based on the X grayscale value X(N) of the N-th frame data IMG[N] and the Y grayscale value Y(N−1) of the N−1-th frame data IMG [N−1].

When the driving controller 200 converts the X grayscale value X(N) of the N-th frame data IMG[N] into the Y grayscale value Y(N) of the N-th frame data IMG[N], the Y grayscale value Y(N) may be different when the temperature TEMP of the display panel 100 and the luminance condition DBV of the display panel 100 are taken into consideration and when the temperature TEMP of the display panel 100 and the luminance condition DBV of the display panel 100 are not taken into consideration. In addition, when the temperature TEMP of the display panel 100 and the luminance condition DBV of the display panel 100 are different, the Y grayscale value Y(N) may be different.

For example, when the temperature TEMP of the display panel 100 and the luminance condition DBV of the display panel 100 are not considered and when the temperature TEMP of the display panel 100 is 10 degrees Celsius and the luminance condition DBV of the display panel 100 is 100 nit, the Y grayscale value Y(N) may be different. In addition, the Y grayscale value Y(N) may be different when the temperature TEMP of the display panel 100 is not 10 degrees Celsius or the luminance condition DBV of the display panel 100 is not 100 nit.

The first lookup table generator 220 may interpolate a first temperature and a first luminance lookup table corresponding to the first temperature and the first luminance condition and a second temperature and a second luminance lookup table corresponding to the second temperature and the second luminance condition to generate a third temperature and a third luminance lookup table corresponding to the third temperature and the third luminance condition between the first temperature and the first luminance condition, and the second temperature and the second luminance condition. For example, the first lookup table generator 220 may generate the first temperature and the first luminance lookup table corresponding to 10 degrees Celsius and 100 nit and the second temperature and the second luminance lookup table corresponding to 20 degrees Celsius and 200 nit, the temperature TEMP of the display panel 100 measured by the temperature sensor 600 may be 15 degrees Celsius, and the luminance condition DBV of the display panel 100 measured by the luminance sensor 700 may be 150 nit. In this case, the first lookup table generator 220 may interpolate the first temperature and the first luminance lookup table corresponding to 10 degrees Celsius and 100 nit and the second temperature and the second luminance lookup table corresponding to 20 degrees Celsius and 200 nit to generate the third temperature and the third luminance lookup table corresponding to 15 degrees Celsius between 10 degrees Celsius and 20 degrees Celsius and 150 nit between 100 nit and 200 nit.

The frame memory 230 may provide the Y grayscale value Y(N−1) of the N−1-th frame data IMG[N−1] to the data converter 210 and the data compensator 240, and store the Y grayscale value Y(N) of the N-th frame data IMG[N].

The data converter 210 may convert the X grayscale value X(N) of the N-th frame data IMG[N] into the Y grayscale value Y(N) of the N-th frame data IMG[N] based on the X grayscale value X(N) of the N-th frame data IMG[N] and the Y grayscale value Y(N−1) of the N−1-th frame data IMG [N−1] to overdrive the grayscale values of the frame data during a plurality of frames. The frame memory 230 may provide the Y grayscale value Y(N−1) of the N−1-th frame data IMG[N−1] to the data converter 210 and the data compensator 240, and store the Y grayscale value Y(N) of the N-th frame data IMG[N].

For example, when the grayscale value of the frame data is changed from 0 Gray in the N−1-th frame to 255 Gray in the N-th frame, the frame memory 230 may provide the Y grayscale value Y(N−1) of the N−1-th frame data IMG[N−1] which is 0 Gray to the data converter 210 and the data compensator 240. The data converter 210 may convert the X grayscale value X(N) of the N-th frame data IMG[N] into the Y grayscale value Y(N) of the N-th frame data IMG[N] which is 150 Gray based on the Y grayscale value Y(N−1) of the N−1-th frame data IMG[N−1] which is 0 Gray and the X grayscale value X(N) of the N-th frame data IMG[N] which is 255 Gray, and provide the Y grayscale value Y(N) of the N-th frame data IMG[N] which is 150 Gray to the frame memory 230. The frame memory 230 may store the Y grayscale value Y(N) of the N-th frame data IMG[N] which is 150 Gray.

The data compensator 240 may compensate the X grayscale value X(N) of the N-th frame data IMG[N] based on the X grayscale value X(N) of the N-th frame data IMG[N] and the Y grayscale value Y(N−1) of the N−1-th frame data IMG[N−1].

The data compensator 240 may generate an overdriving compensation value based on the X grayscale value X(N) of the N-th frame data IMG[N] and the Y grayscale value Y(N−1) of the N−1-th frame data IMG[N−1] which is provided from the frame memory 230.

For example, when the X grayscale value X(N) of the N-th frame data IMG[N] is 255 Gray, and the Y grayscale value Y(N−1) of the N−1-th frame data IMG[N−1] provided from the frame memory 230 is 0 Gray, and the driving controller 200 does not overdrive the X grayscale value X(N) of the N-th frame data IMG[N], the actual luminance of the display panel 100 may increase to a luminance corresponding to 155 Gray. In this case, in order to shorten the time for the target luminance reaching rate to reach 100%, the data compensator 240 may generate the overdriving compensation value which is 50 Gray and overdrive the grayscale value of the frame data by 50 Gray to convert the grayscale value of the frame data which is 255 Gray into 305 Gray. In this case, in the N-th frame, the actual luminance of the display panel 100 may increase to a luminance corresponding to 186 Gray, which is higher than a luminance corresponding to 155 Gray. Accordingly, the time for the target luminance reaching rate to reach 100% may be shortened.

When the X grayscale value X(N) of the N-th frame data IMG[N] and the Y grayscale value Y(N−1) of the N−1-th frame data IMG[N−1] are the same, the data compensator 240 may generate the overdriving compensation value which is 0 Gray. For example, when the X grayscale value X(N) of the N-th frame data IMG[N] and the Y grayscale value Y(N−1) of the N−1-th frame data IMG[N−1] are equal to 255 Gray, the overdriving compensation value may be 0 Gray. Accordingly, the data compensator 240 may not overdrive the X grayscale value X(N) of the N-th frame data IMG[N].

When the X grayscale value X(N) of the N-th frame data IMG[N] and the Y grayscale value Y(N−1) of the N−1-th frame data IMG[N−1] are different, the overdriving compensation value may not be 0 Gray. For example, when the X grayscale value X(N) of the N-th frame data IMG[N] is 255 Gray and the Y grayscale value Y(N−1) of the N−1-th frame data IMG[N−1] is 0 Gray, the overdriving compensation value may not be 0 Gray. Accordingly, the data compensator 240 may overdrive the X grayscale value X(N) of the N-th frame data IMG[N] by the compensation value.

Figure 5:
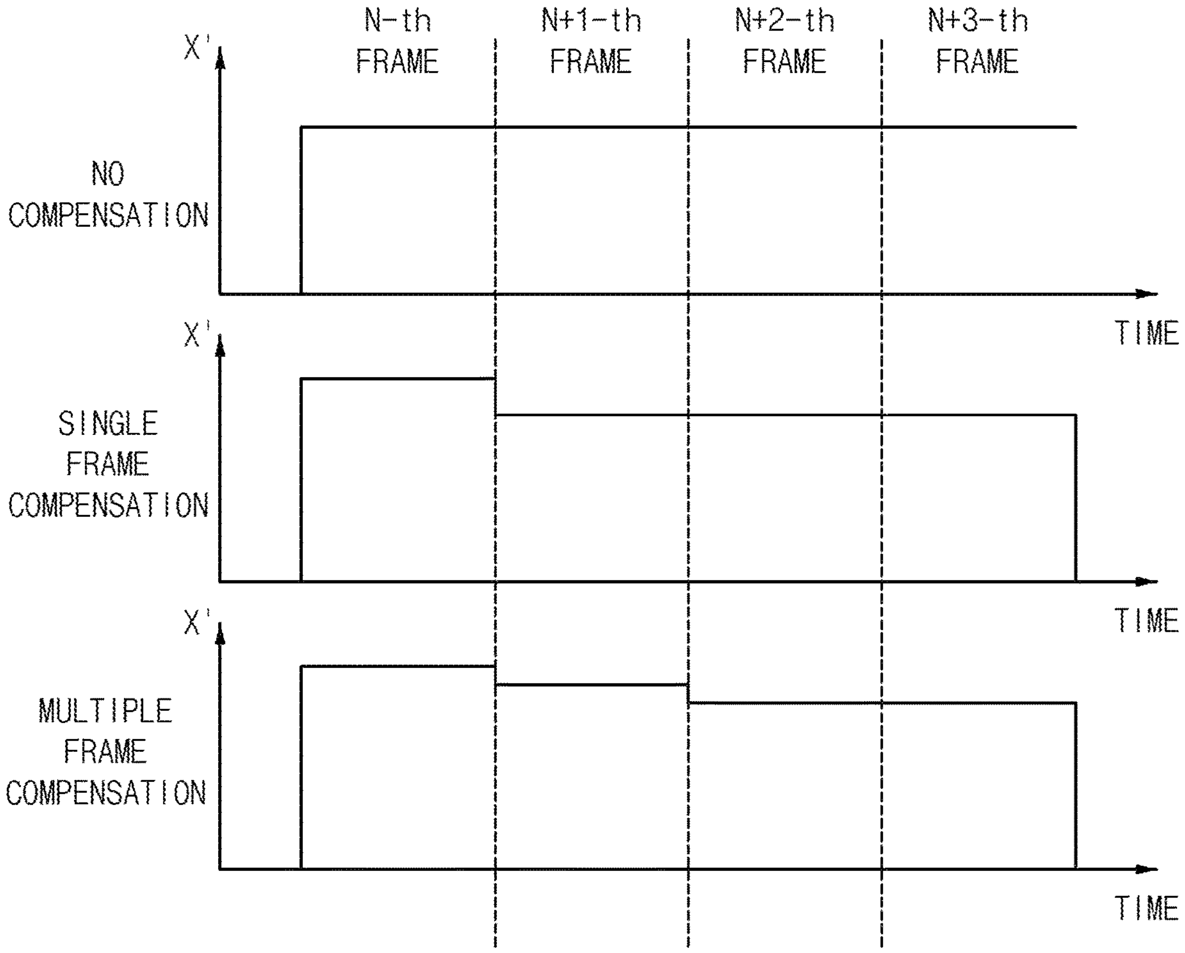
FIG. 5 is a timing diagram illustrating a change in a grayscale value of frame data when the driving controller of FIG. 1 performs an operation of FIG. 4.
Figure 6:
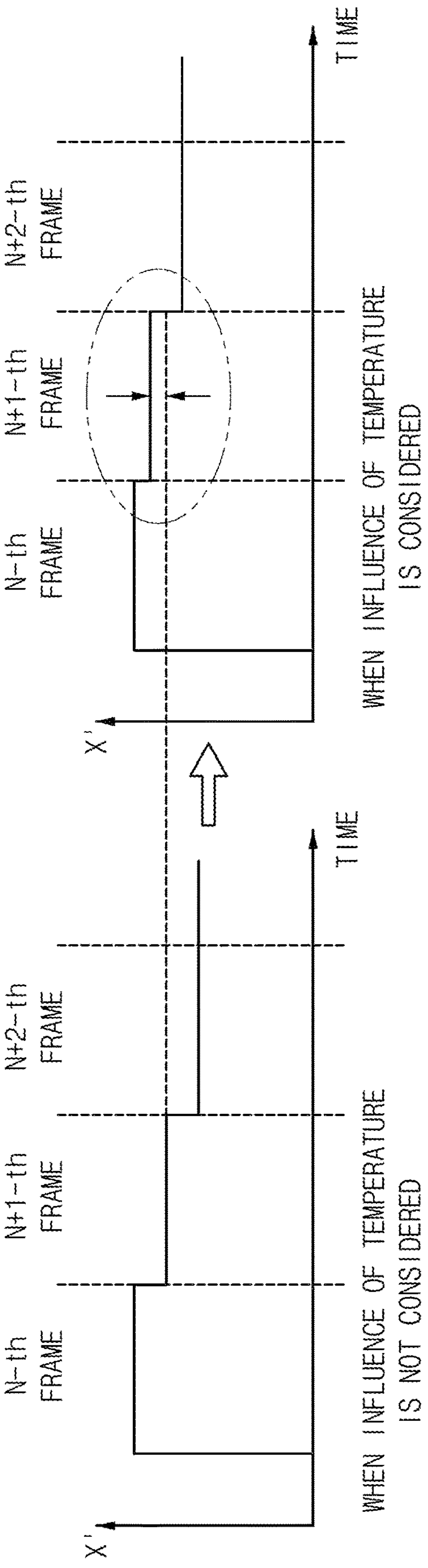
FIG. 6 is a timing diagram of FIG. 5 in consideration of an influence of a temperature of the display panel.
Figure 7:
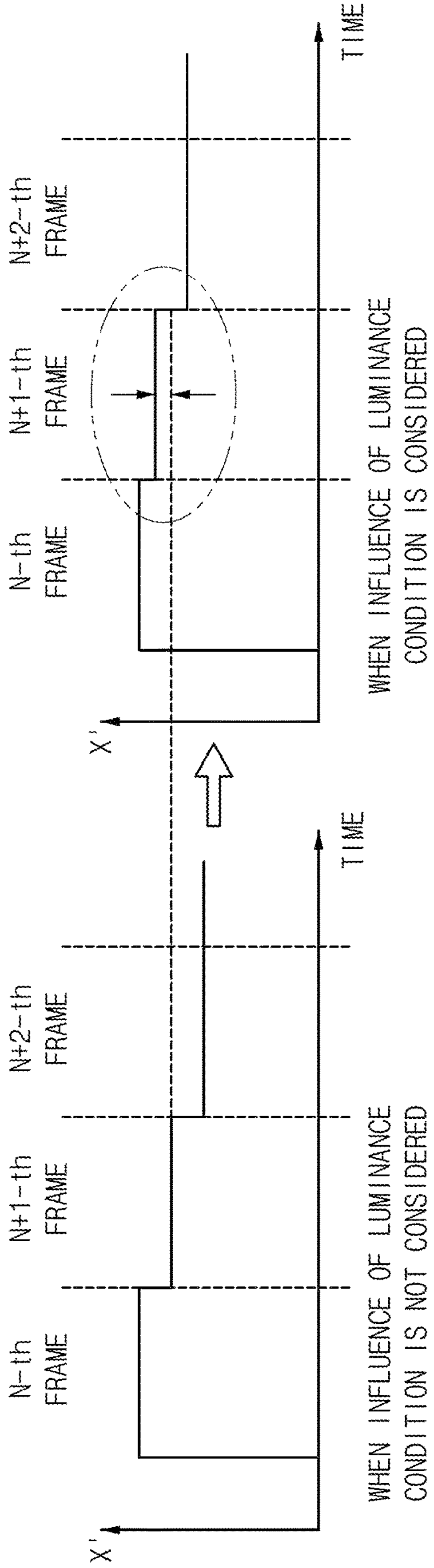
FIG. 7 is a timing diagram of FIG. 5 in consideration of an influence of a luminance condition of the display panel.

FIG. 5 is a timing diagram illustrating a change in a grayscale value of frame data when the driving controller of FIG. 1 performs an operation of FIG. 4. FIG. 6 is a timing diagram of FIG. 5 in consideration of an influence of a temperature of the display panel. FIG. 7 is a timing diagram of FIG. 5 in consideration of an influence of a luminance condition of the display panel.

Referring to FIGS. 1 to 7, the driving controller 200 may overdrive the grayscale values of frame data for frames without increasing the number of the frame memories 230 to reduce the time for the target luminance reaching rate to reach 100%, and prevent the blur and the color drag from occurring in the display panel 100.

For example, when the grayscale value of the frame data is changed from 0 Gray in the N−1-th frame to 255 Gray in the N-th frame and the overdriving is not applied, the actual luminance of the display panel 100 may not increase to the luminance corresponding to 255 Gray, but may increase to 150 Gray (e.g., NO COMPENSATION).

In order to shorten the time for the target luminance reaching rate to reach 100%, the data compensator 240 may overdrive the X grayscale value X(N) of the N-th frame data IMG[N] which is 255 Gray based on the X grayscale value X(N) of the N-th frame data IMG[N] which is 255 Gray and the Y grayscale value Y(N−1) of the N−1-th frame data IMG[N−1] which is 0 Gray provided from the frame memory 230. This may be seen from the SINGLE FRAME COMPENSATION chart. The X grayscale value X(N) of the N-th frame data IMG[N] may increase from 255 Gray to 305 Gray by the overdriving, so that the X' grayscale value X(N) may be 305 Gray. In this case, the actual luminance of the display panel 100 in the N-th frame may be a luminance corresponding to 186 Gray. In this case, the data converter 210 may convert the X grayscale value X(N) of the N-th frame data IMG[N] which is 255 Gray into the Y grayscale value Y(N) of the N-th frame data IMG[N] which is 186 Gray based on the X grayscale value X(N) of the N-th frame data IMG[N] which is 255 Gray and the Y grayscale value Y(N−1) of the N-th frame data IMG[N−1] which is 0 Gray.

Next, when the grayscale value of the frame data is 255 Gray in the N-th frame and 255 Gray in the N+1-th frame, the data compensator 240 may overdrive the X grayscale value X(N+1) of the N+1-th frame data IMG[N+1] based on the X grayscale value X(N+1) of the N+1-th frame data IMG[N+1] which is 255 Gray and the Y grayscale value Y(N) of the N-th frame data IMG[N] which is 186 Gray. This may be seen from the MULTIPLE FRAME COMPENSATION chart. The X grayscale value X(N+1) of the N+1-th frame data IMG[N+1] may increase from 255 Gray to 280 Gray by the overdriving, the X grayscale value X'(N+1) may be 280 Gray, and the actual luminance of the display panel 100 in the N-th frame may be a luminance corresponding to 231 Gray. In this case, data converter 210 may convert the X grayscale value X(N+1) of the N+1-th frame data IMG [N+1] which is 255 Gray into the Y grayscale value Y(N+1) of the N+1-th frame data IMG[N+1] which is 231 Gray based on the X grayscale value X(N+1) of the N+1-th frame data IMG[N+1] which is 255 Gray and the Y grayscale value Y(N) of the N-th frame data IMG[N] which is 186 Gray.

The data converter 210 may convert the X grayscale value X(N) of the N-th frame data IMG[N] into the Y grayscale value Y(N) of the N-th frame data IMG[N] based on the X grayscale value X(N) of the N-th frame data IMG[N], the Y grayscale value Y(N−1) of the N−1-th frame data IMG[N−1] and the temperature TEMP of the display panel 100.

As shown in FIG. 6, the overdriving compensation value when an influence of the temperature TEMP of the display panel 100 is not taken into consideration is different from the overdriving compensation value when the influence of the temperature TEMP of the display panel 100 is considered. As shown in FIG. 6, the overdriven grayscale value X'(N+1) in the N+1-th frame when the influence of the temperature TEMP of the display panel 100 is not taken into consideration is different from the overdriven grayscale value X'(N+1) in the N+1-th frame when the influence of the temperature TEMP of the display panel 100 is considered. For example, the overdriven grayscale value X'(N+1) in the N+1-th frame when the influence of the temperature TEMP of the display panel 100 is not taken into consideration is less than the overdriven grayscale value X'(N+1) in the N+1-th frame when the influence of the temperature TEMP of the display panel 100 is considered.

The data converter 210 may convert the X grayscale value X(N) of the N-th frame data IMG[N] into the Y grayscale value Y(N) of the N-th frame data IMG[N] based on the X grayscale value X(N) of the N-th frame data IMG[N], the Y grayscale value Y(N−1) of the N−1-th frame data IMG[N−1] and the luminance condition DBV of the display panel 100.

As shown in FIG. 7, the overdriving compensation value when an influence of the luminance condition DBV of the display panel 100 is not taken into consideration is different from the overdriving compensation value when the influence of the luminance condition DBV of the display panel 100 is considered. As shown in FIG. 7, the overdriven grayscale value X'(N+1) in the N+1-th frame when the influence of the luminance condition DBV of the display panel 100 is not taken into consideration is different from the overdriven grayscale value X'(N+1) in the N+1-th frame when the influence of the luminance condition DBV of the display panel 100 is considered. For example, the overdriven grayscale value X'(N+1) in the N+1-th frame when the influence of the luminance condition DBV of the display panel 100 is not taken into consideration is less than the overdriven grayscale value X'(N+1) in the N+1-th frame when the influence of the luminance condition DBV of the display panel 100 is considered.

In this embodiment, the driving controller 200 may include the data converter 210 which converts the X grayscale value X(N) of the N-th frame data IMG[N] into the Y grayscale value Y(N) of the N-th frame data IMG[N] based on the X grayscale value X(N) of the N-th frame data IMG[N] and the Y grayscale value Y(N−1) of the N−1-th frame data IMG[N−1], and provides the Y grayscale value Y(N−1) of the N−1-th frame data IMG[N−1] to frame memory 230. Since the frame memory 230 does not store the input grayscale value of the input image data IMG as it is, but stores the grayscale value converted by the data converter 210, the data compensator 240 may apply overdriving for the plurality of frames without increasing the number of the frame memories 230. Accordingly, even when it takes a long time for the actual luminance of the display panel 100 to reach the target luminance due to a large change in the grayscale value of the input image data IMG the blur and the color drag in the display panel 100 may be prevented.

Figure 8:
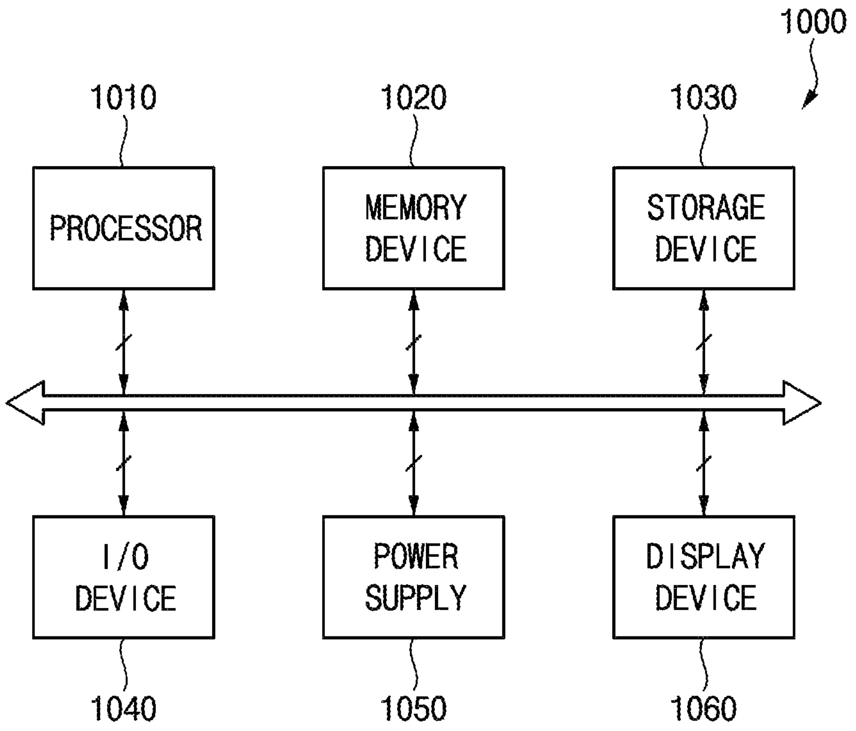
FIG. 8 is a block diagram illustrating an electronic device according to an embodiment of the present inventive concept.
Figure 9:
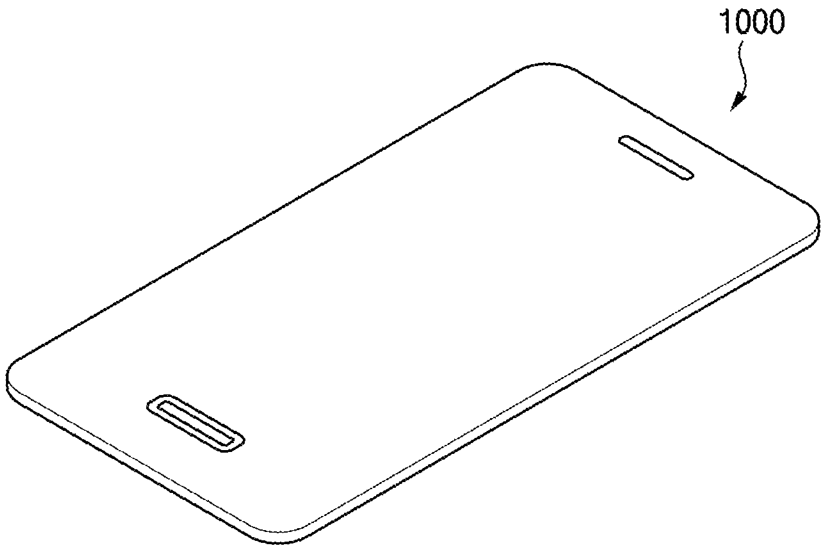
FIG. 9 is a diagram illustrating an example in which the electronic device of FIG. 8 is implemented as a smart phone.

FIG. 8 is a block diagram illustrating an electronic device 1000 according to an embodiment of the present inventive concept. FIG. 9 is a diagram illustrating an example in which the electronic device 1000 of FIG. 8 is implemented as a smart phone.

Referring to FIGS. 8 and 9, the electronic device 1000 may include a processor 1010, a memory device 1020, a storage device 1030, an input/output (I/O) device 1040, a power supply 1050, and a display device 1060. The display device 1060 may be the display device of FIG. 1. In addition, the electronic device 1000 may further include a plurality of ports for communicating with a video card, a sound card, a memory card, a universal serial bus (USB) device, other electronic device, and the like.

In an embodiment of the present inventive concept, as illustrated in FIG. 9, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like. The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like, and an output device such as a printer, a speaker, and the like. In some embodiments of the present inventive concept, the I/O device 1040 may include the display device 1060. The power supply 1050 may provide power for operations of the electronic device 1000.

Embodiments of inventive concept may be applied to any display device and any electronic device including the touch panel. For example, embodiments of the inventive concept may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the teachings and scope of the present inventive concept. Accordingly, all such modifications are intended to be included within the scope of the present inventive concept as set forth in the claims.

What is claimed is:

1. A driving controller, comprising:

a data converter configured to convert an X grayscale value of N-th frame data into a Y grayscale value of the N-th frame data based on a Y grayscale value of N−1-th frame data, wherein the Y grayscale value of the N-th frame data represents a grayscale value corresponding to the actual luminance of the N-th frame data, and the Y grayscale value of the N−1-th frame data represents a grayscale value corresponding to the actual luminance of the N−1-th frame data;

a frame memory configured to receive the Y grayscale value of the N-th frame data directly from the data convertor and output the Y grayscale value of N−1-th frame data to the data converter; and a data compensator configured to compensate the X grayscale value of the N-th frame data based on the X grayscale value of the N-th frame data and the Y grayscale value of the N−1-th frame data and generate a compensated grayscale value for the N-th frame data, wherein the compensated grayscale value is applied for overdriving a display panel over a plurality of frames, and wherein N is a natural number greater than or equal to 2, wherein the data converter is configured to convert the X grayscale value of the N-th frame data into the Y grayscale value of the N-th frame data based on the X grayscale value of the N-th frame data and the Y grayscale value of the N−1-th frame data, wherein when the X grayscale value of the N-th frame data and the Y grayscale value of the N−1-th frame data are different, the data converter is configured to generate the Y grayscale value of the N-th frame data that is adjusted for the overdriving based on the X grayscale value of the N-th frame data and the Y grayscale value of the N−1-th frame data, wherein the Y grayscale value of the N-th frame data is distinct from both the X grayscale value of the N-th frame data and the Y grayscale value of the N−1-th frame data, wherein the Y grayscale value of the N-th frame data is stored in the frame memory for use in adjusting subsequent frame data based on the Y grayscale value of the N−1th frame data, and wherein when the X grayscale value of the N-th frame data and the Y grayscale value of the N−1-th frame data are different, the Y grayscale value of the N-th frame data is a value between the X grayscale value of the N-th frame data and the Y grayscale value of the N−1-th frame data.

2. The driving controller of claim 1, wherein the data converter is configured to convert the X grayscale value of the N-th frame data into the Y grayscale value of the N-th frame data based on the X grayscale value of the N-th frame data, the Y grayscale value of the N−1-th frame data, and a temperature of a display panel.

3. The driving controller of claim 2, further comprising a first lookup table generator, wherein the first lookup table generator is configured to generate a first lookup table based on the temperature of the display panel, and wherein the driving controller is configured to convert the X grayscale value of the N-th frame data into the Y grayscale value of the N-th frame data using the first lookup table.

4. The driving controller of claim 3, wherein the first lookup table generator is configured to interpolate a first temperature lookup table corresponding to a first temperature and a second temperature lookup table corresponding to a second temperature to generate a third temperature lookup table corresponding to a third temperature between the first temperature and the second temperature.

5. The driving controller of claim 1, wherein the data converter is configured to convert the X grayscale value of the N-th frame data into the Y grayscale value of the N-th frame data based on the X grayscale value of the N-th frame data, the Y grayscale value of the N−1-th frame data, and a luminance condition of a display panel.

6. The driving controller of claim 5, further comprising a first lookup table generator, wherein the first lookup table generator is configured to generate a first lookup table based on the luminance condition of the display panel, and wherein the driving controller is configured to convert the X grayscale value of the N-th frame data into the Y grayscale value of the N-th frame data using the first lookup table.

7. The driving controller of claim 1, wherein the data compensator is configured to generate an overdriving compensation value to compensate the X grayscale value of the N-th frame data based on the X grayscale value of the N-th frame data and the Y grayscale value of the N−1-th frame data.

8. The driving controller of claim 7, wherein when the X grayscale value of the N-th frame data and the Y grayscale value of the N−1-th frame data are same, the overdriving compensation value is 0.

9. The driving controller of claim 7, wherein when the X grayscale value of the N-th frame data and the Y grayscale value of the N−1-th frame data are different, the overdriving compensation value is not 0.

10. The driving controller of claim 9, wherein the data compensator is configured to compensate the X grayscale value of the N-th frame data by adding the overdriving compensation value to the X grayscale value of the N-th frame data.

11. A display device, comprising:

a display panel configured to display an image based on a plurality of frame data of input image data:

a driving controller including a data converter configured to convert an X grayscale value of N-th frame data into a Y grayscale value of the N-th frame data based on a Y grayscale value of N−1-th frame data, wherein the Y grayscale value of the N-th frame data represents a grayscale value corresponding to the actual luminance of the N-th frame data, and the Y grayscale value of the N−1-th frame data represents a grayscale value corresponding to the actual luminance of the N−1-th frame data, and to directly provide the Y grayscale value of the N-th frame data to a frame memory, the frame memory configured to provide the Y grayscale value of N−1-th frame data to the data converter and a data compensator, and to store the Y grayscale value of the N-th frame data, and the data compensator configured to compensate the X grayscale value of the N-th frame data based on the X grayscale value of the N-th frame data and the Y grayscale value of the N−1-th frame data, and to generate a X' grayscale value of the N-th frame data, wherein the X' grayscale value of the N-th frame data is applied for overdriving the display panel over a plurality of frames; and a data driver configured to convert the X' grayscale value of the N-th frame data into a data voltage, and to output the data voltage to the display panel, wherein N is a natural number greater than or equal to 2, wherein the data converter is configured to convert the X grayscale value of the N-th frame data into the Y grayscale value of the N-th frame data based on the X grayscale value of the N-th frame data and the Y grayscale value of the N−1-th frame data, wherein when the X grayscale value of the N-th frame data and the Y grayscale value of the N−1-th frame data are different, the data converter is configured to generate the Y grayscale value of the N-th frame data that is adjusted for the overdriving based on the X grayscale value of the N-th frame data and the Y grayscale value of the N−1-th frame data, wherein the Y grayscale value of the N-th frame data is distinct from both the X grayscale value of the N-th frame data and the Y grayscale value of the N−1-th frame data, wherein the Y grayscale value of the N-th frame data is stored in the frame memory for use in adjusting subsequent frame data based on the Y grayscale value of the N−1-th frame data, and wherein when the X grayscale value of the N-th frame data and the Y grayscale value of the N−1-th frame data are different, the Y grayscale value of the N-th frame data is a value between the X grayscale value of the N-th frame data and the Y grayscale value of the N−1-th frame data.

12. The display device of claim 11, wherein the data converter is configured to convert the X grayscale value of the N-th frame data into the Y grayscale value of the N-th frame data based on the X grayscale value of the N-th frame data, the Y grayscale value of the N−1-th frame data, and a temperature of the display panel.

13. The display device of claim 11, wherein the data converter is configured to convert the X grayscale value of the N-th frame data to the Y grayscale value of the N-th frame data based on the X grayscale value of the N-th frame data, the Y grayscale value of the N−1-th frame data, and a luminance condition of the display panel.

14. The display device of claim 11, wherein the data compensator is configured to generate an overdriving compensation value to compensate the X grayscale value of the N-th frame data based on the X grayscale value of the N-th frame data and the Y grayscale value of the N−1-th frame data.

15. A driving controller, comprising:

a data converter configured to receive an X grayscale value of N-th frame data and a Y grayscale value of N−1-th frame data and convert the X grayscale value of the N-th frame data into a Y grayscale value of the N-th frame data using at least one of temperature and luminance information of a display panel, wherein the Y grayscale value of the N-th frame data represents a grayscale value corresponding to the actual luminance of the N-th frame data, and the Y grayscale value of the N−1-th frame data represents a grayscale value corresponding to the actual luminance of the N−1-th frame data;

a frame memory configured to directly receive the Y grayscale value of the N-th frame data from the data convertor and output the Y grayscale value of the N−1-th frame data, and a data compensator configured to receive the Y grayscale value of the N−1-th frame data from the frame memory and receive the X grayscale value of the N-th frame data and generate a compensated grayscale value of the N-th frame data based on the X grayscale value of the N-th frame data and the Y grayscale value of the N−1-th frame data, wherein the compensated grayscale value is applied for overdriving a display panel over a plurality of frames, and wherein N is a natural number greater than or equal to 2, wherein the data converter is configured to convert the X grayscale value of the N-th frame data into the Y grayscale value of the N-th frame data based on the X grayscale value of the N-th frame data and the Y grayscale value of the N−1-th frame, wherein when the X grayscale value of the N-th frame data and the Y grayscale value of the N−1-th frame data are different, the data converter is configured to generate the Y grayscale value of the N-th frame data that is adjusted for the overdriving based on the X grayscale value of the N-th frame data and the Y grayscale value of the N−1-th frame data, wherein the Y grayscale value of the N-th frame data is distinct from both the X grayscale value of the N-th frame data and the Y grayscale value of the N−1-th frame data, wherein the Y grayscale value of the N-th frame data is stored in the frame memory for use in adjusting subsequent frame data based on the Y grayscale value of the N−1-th frame data, and wherein when the X grayscale value of the N-th frame data and the Y grayscale value of the N−1-th frame data are different, the Y grayscale value of the N-th frame data is a value between the X grayscale value of the N-th frame data and the Y grayscale value of the N−1-th frame data.

* * * * *